United States Patent [19]

Truc et al.

[11] Patent Number: 4,911,777

[45] Date of Patent: Mar. 27, 1990

[54] METHOD FOR MANUFACTURING PHOTOGRAPH SLIDE SLEEVING MATERIAL

[75] Inventors: James A. Truc, Wayzata, Minn.; Nils Lund-Nielsen, San Marcos, Calif.

[73] Assignee: Pakon, Inc., Minnetonka, Minn.

[21] Appl. No.: 158,243

[22] Filed: Feb. 19, 1988

[51] Int. Cl.[4] .................... B32B 31/18

[52] U.S. Cl. .................... 156/252; 156/256; 156/270; 156/290; 156/292; 40/405; 40/536; 40/537; 383/37; 383/38; 383/39

[58] Field of Search .................... 156/226, 227, 250, 256, 156/263, 268, 270, 511, 252, 253, 290, 292; 40/122, 159.2, 405, 536, 537; 383/38, 39, 37

[56] References Cited

U.S. PATENT DOCUMENTS

| | | | |
|---|---|---|---|
| 2,565,367 | 8/1951 | Greenhalgh | 156/270 |
| 3,254,828 | 6/1966 | Lerner | 383/37 |
| 3,735,516 | 5/1973 | Wenstrom | 40/536 |
| 4,170,081 | 10/1979 | Kiejzik | 40/537 |
| 4,171,831 | 10/1979 | Robinson | 156/270 |
| 4,234,086 | 11/1980 | Dorton | 383/37 |
| 4,713,136 | 12/1987 | Li | 156/270 |

FOREIGN PATENT DOCUMENTS

| | | | |
|---|---|---|---|
| 995328 | 6/1965 | United Kingdom | 40/537 |

OTHER PUBLICATIONS

Webtron Corporation, advertisement entitled "Introducing the 650-II. Nine New Features turn a Workhorse into a Racehorse", 1 sheet.

Labogken Co., Ltd., circular entitled "Film Sleever (Film Cutting Inserter)", 2 sheets.

Picture Pocket Corporation, brochure entitled "The Supermarket for Sleeving Material", 4 pages.

Plastican Corporation, circular entitled "Organize Your Slides, Transparencies, Prints and Negatives in Plastican Viny Plages", 2 sheets.

Plastican Corporation, circular entitled "Plastican Slide Frames Twenty Slides at a Glance", 1 sheet.

Photo Plastic Products, Inc., circular entitled "Print File", 2 sheets.

Vu-All, Inc., circular entitled "Top Load Heavyweight 2×2 Slide Page Format", 1 sheet.

Vue-All, Inc. circular entitled "Slide Load Heavyweight 2×2 Slide Page Format", 1 sheet.

*Primary Examiner*—Caleb Weston

*Attorney, Agent, or Firm*—Kinney & Lange

[57] ABSTRACT

Photograph slide sleeving material is manufactured by cutting pocket opening slots in an elongated first web section of polymer film material as the web is continuously moved through a slot cutting station. The slotted first web section and an adjacent elongated second web section of polymer film material are continuously moved through a laminating station where they are laminated at locations forming pocket bottom walls and side walls. An elongated web of photograph slide sleeving material having a plurality of rows of pockets emerges from the laminating station and is continuously moved through a perforating station where it is perforated between adjacent rows of pockets. Ring binder storage files and hanging storage files are assembled by separating sheets of slide sleeving material from the elongated web and attaching storage mounts having adhesive edges.

7 Claims, 7 Drawing Sheets

METHOD FOR MANUFACTURING PHOTOGRAPH SLIDE SLEEVING MATERIAL

BACKGROUND OF THE INVENTION

1. Field of the Invention

The present invention relates generally to photograph slide sleeving material. In particular, the present invention is a method for manufacturing photograph slide sleeving material and slide storage files therefrom.

2. Description of the Prior Art

Slide sleeves in the form of acetate or clear plastic pages with pockets are commonly used to store photograph slides. These pages are typically 8½ by 11 inches in size and include five rows of four pockets. Twenty 35 mm photograph slides can therefore be stored on a page. One edge of the page is generally adapted to be inserted in a ring binder or suspended from a hanging file. Manufacturers of slide sleeving pages of the types described above include Photo Plastic Products, Inc., Pacific Foto Supply Company, Plastican Corp., Vue-All, Inc., and Picture Pocket Corp.

Slide sleeve pages of these types appear to be individually manufactured following a sequence of steps. A main back sheet of polymer film material which is typically clear is first laid down. Five individual strips having a width of approximately 1⅞ inches are then pulled across the sheet in a transverse direction. The individual strips are then laminated to the main back sheet at locations forming pocket bottom and side walls. The lamination appears to be done by welding or heat sealing. The page is then cut from the main back sheet.

The above-described manufacturing process is relatively expensive due to the discontinuous motion required to form individual pages. Photograph slides must also be manually inserted into the pockets of these photograph pages. This results in added costs for organizations which load large volumes of slides. Although pages of these types work well for storage, they form a rather large package to ship through the mail. Since they cannot fit within the standard four by six inch envelopes used by photofinishers to deliver prints, photograph slides are generally packaged and shipped in boxes. These boxes are heavy, and cost more to mail than envelopes.

It is evident that there is a continuing need for improved photograph slide sleeving material and storage files. Slide sleeving material which can be inexpensively manufactured and used with automatic slide loading equipment is desired. Slide sleeving material which can be packaged in envelopes commonly used by photofinishers, and assembled into storage files, would also be useful.

SUMMARY OF THE INVENTION

The present invention is a method for manufacturing photograph slide sleeving material. A continuously moving first web section of polymer film material is provided to a cutting station. Pocket opening slots are cut in the first web section of film material as it moves past the cutting station, thereby forming a slotted first web section of film material. The slotted first web section of film material is continuously moved to a laminating station. A continuously moving second web section of polymer film material is also provided to the laminating station. The slotted first web section of film material and the second web section of film material are laminated to form pocket bottom walls and side walls while they move past the laminating station. A web of slide sleeving material having pockets formed therein emerges from the laminating station.

In one embodiment, the first and second web sections of film material are provided from rolls of film material. The first and second web sections of film material are laminated by heat sealing at locations forming the pocket side walls and bottom walls. The web of slide sleeving material can be perforated as it moves past a perforating station, and wound onto a take-up reel. Slide storage files can be formed by separating sheets of slide sleeving material from the web, and attaching hanging file or ring binder storage mounts by means of an adhesive strip.

Slide sleeving material in accordance with the present invention can be produced at high speeds in a continuous web to keep costs down. Since this slide sleeving material is formed in a continuous web, it is also well suited for use with automatic photograph slide sleeving systems. Sections of the sleeving material which are loaded with photograph slides and torn from the web can be folded for compact storage, and packaged within envelopes commonly used in the photofinishing industry. Ring binder and hanging storage files can also be easily and inexpensively formed from the sleeving material.

DETAILED DESCRIPTION OF THE PREFERRED EMBODIMENTS

Figure 1:
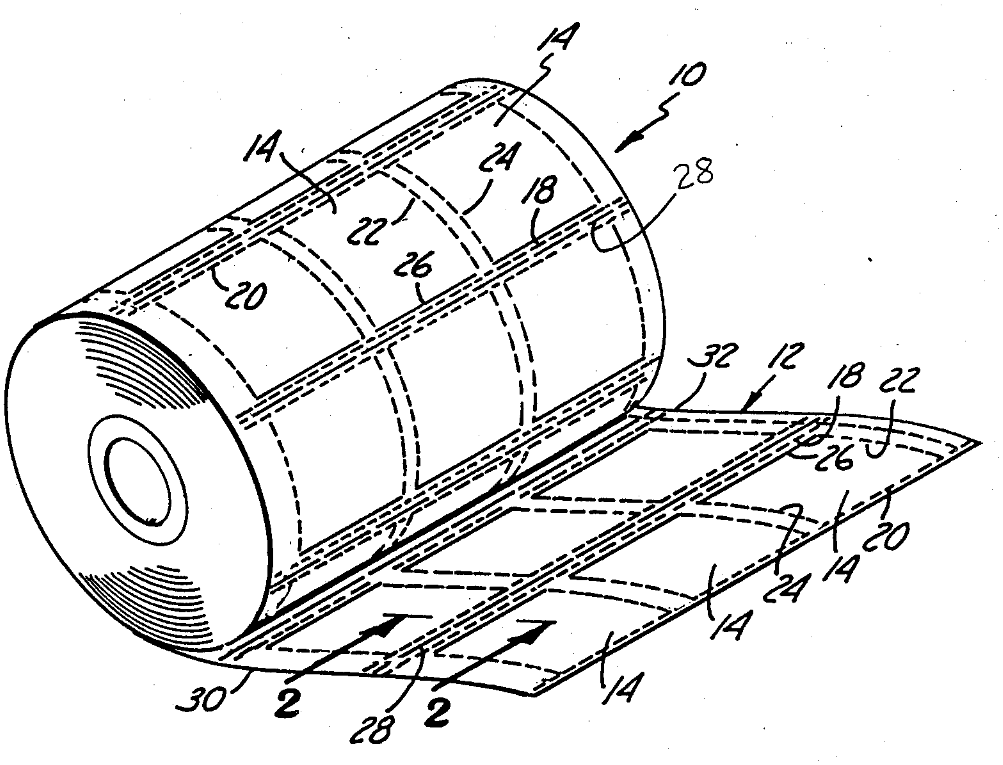
FIG. 1 is a roll of slide sleeving material manufactured in accordance with the present invention.
Figure 2:
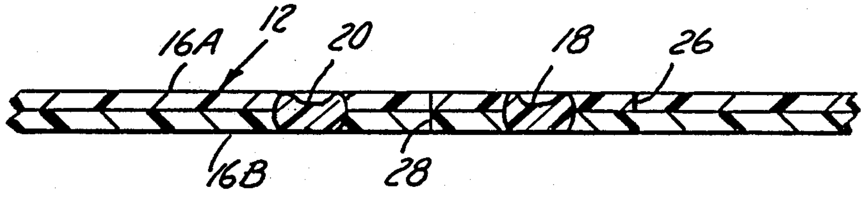
FIG. 2 is a sectional view, taken from the side, of a portion of the slide sleeving material shown in FIG. 1.
Figure 4:
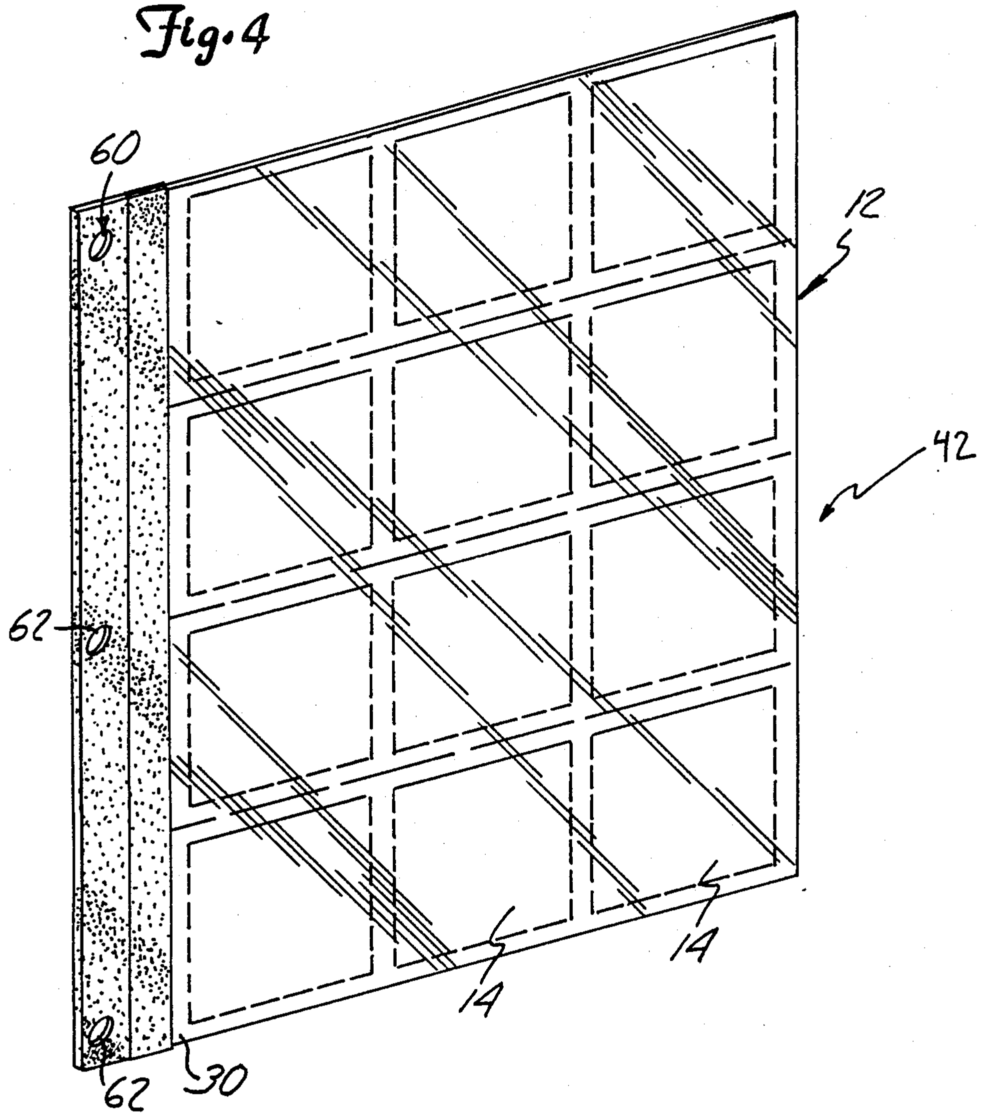
FIG. 4 is a ring binder slide storage file assembled from a section of slide sleeving material manufactured in accordance with the present invention.

A roll 10 of slide sleeving material 12 fabricated in accordance with the present invention is illustrated generally in FIG. 1, while a cross-section of a portion of the sleeving material is illustrated in FIG. 2. As shown, sleeving material 12 is formed by a first polymer film web section 16A and a second polymer film web section 16B which are laminated together to form a geometric array of pockets 14. In the embodiment shown in FIG. 1, each pocket 14 is defined by a top wall 18, bottom wall 20, and a pair of side walls 22 and 24. Each pocket 14 also includes a pocket opening slot 26. Other embodiments (i.e., that shown in FIG. 4) do not include top walls 18, but can be otherwise identical. Rows of perforations 2 separate adjacent rows of pockets 14. Pockets 14 can be adapted to hold standard 35 mm photograph slides.

Side walls 22 and 24, bottom wall 20 and top wall 18 of pockets 14 are formed by joining first film web section 16A to second film 16B at the desired locations. Film web sections 16A and 16B are laminated by intermittant heat seals in the illustrated embodiment. Top walls 18 and bottom walls 20 of pockets 14 in a given row are formed by intermittent or broken heat seals which extend linearly between edges 30 and 32 of sleeving material 12. Side walls 22 and 24 of pockets 14 of adjacent rows are formed by broken heat seals which extend linearly about a longitudinal axis of sleeving material 12, perpendicular to edges 30 and 32. Other methods such as continuous (unbroken) heat seals or ultrasonic welding can also be used to laminate film web sections 16A and 16B. Slots 26 of a given row of pockets 14 are parallel to bottom walls 20, separate from one another, and extend between side walls 22 and 24 of the respective pocket. Pocket opening slots 26 can be cut through first web section 16A before it is laminated to second web section 16B.

Sleeving material 12 includes parallel rows of three pockets 14 in the embodiment shown. In preferred embodiments, sleeving material 12 is 7.440 inches wide. Each pocket 14 can be 2.063 inches wide (i.e. the distance between its side walls 22 and 24). Pockets 14 are separated from one another along the transverse direction parallel to perforations 28 by 0.250 inches (i.e. the distance between side wall 24 of one pocket 14 and side wall 22 of an adjacent pocket). Side walls 24 of pockets 14 adjacent first edge 30 are separated from the edge by a distance of 0.500 inches. Side wall 22 of pocket 14 adjacent second edge 32 are spaced from the edge by 0.251 inches. Slots 26 of pockets 14 can be separated from corresponding bottom walls 20 by 2.190 inches. Perforation rows 28 can be spaced from one another by 2.375 inches and rows of pockets 14 centered therebetween. In one embodiment, web sections 16A and 16B are 1.65 mil. thick films of clear Crown Zeelon 339. This material is commercially available from Crown Zellerbach. In other embodiments, one of web sections 16A add 16B is clear, while the other is matte. Other materials and colors can also be used.

Sleeving material 12 having pockets 14 with the dimensions described above can firmly hold standard two inch by two inch 35 mm photograph slides, yet permit automatic insertion by machine. When loaded with photograph slides and folded at every other row of perforations 28, a flat package of photograph slides having a dimension of just over four by six inches is formed. These package photograph slides can fit into standard photofinishing envelopes used for returning four by six inch prints.

Figure 3:
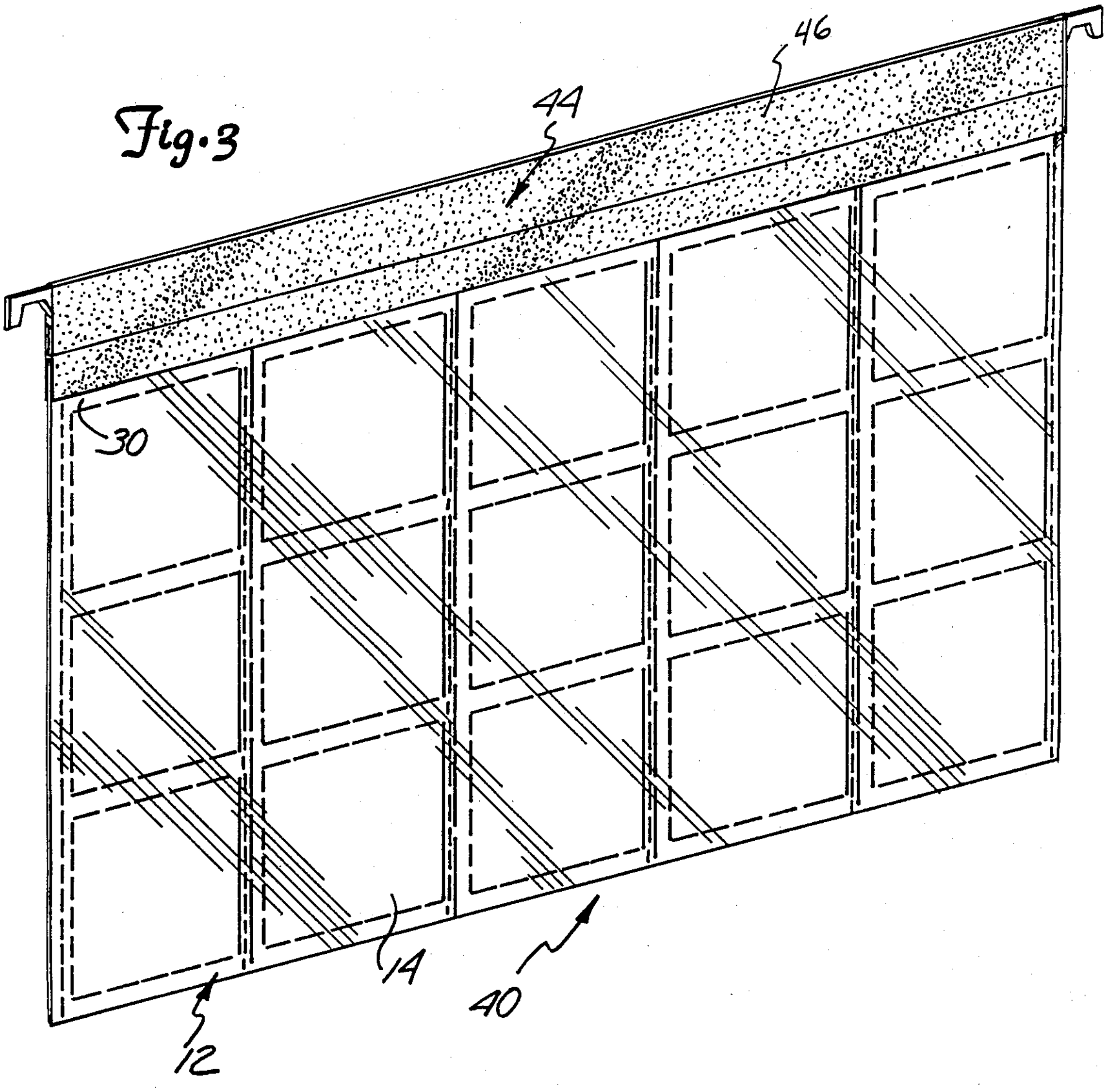
FIG. 3 is an illustration of a hanging slide storage file assembled from a section of slide sleeving material manufactured in accordance with the present invention.
Figure 5:
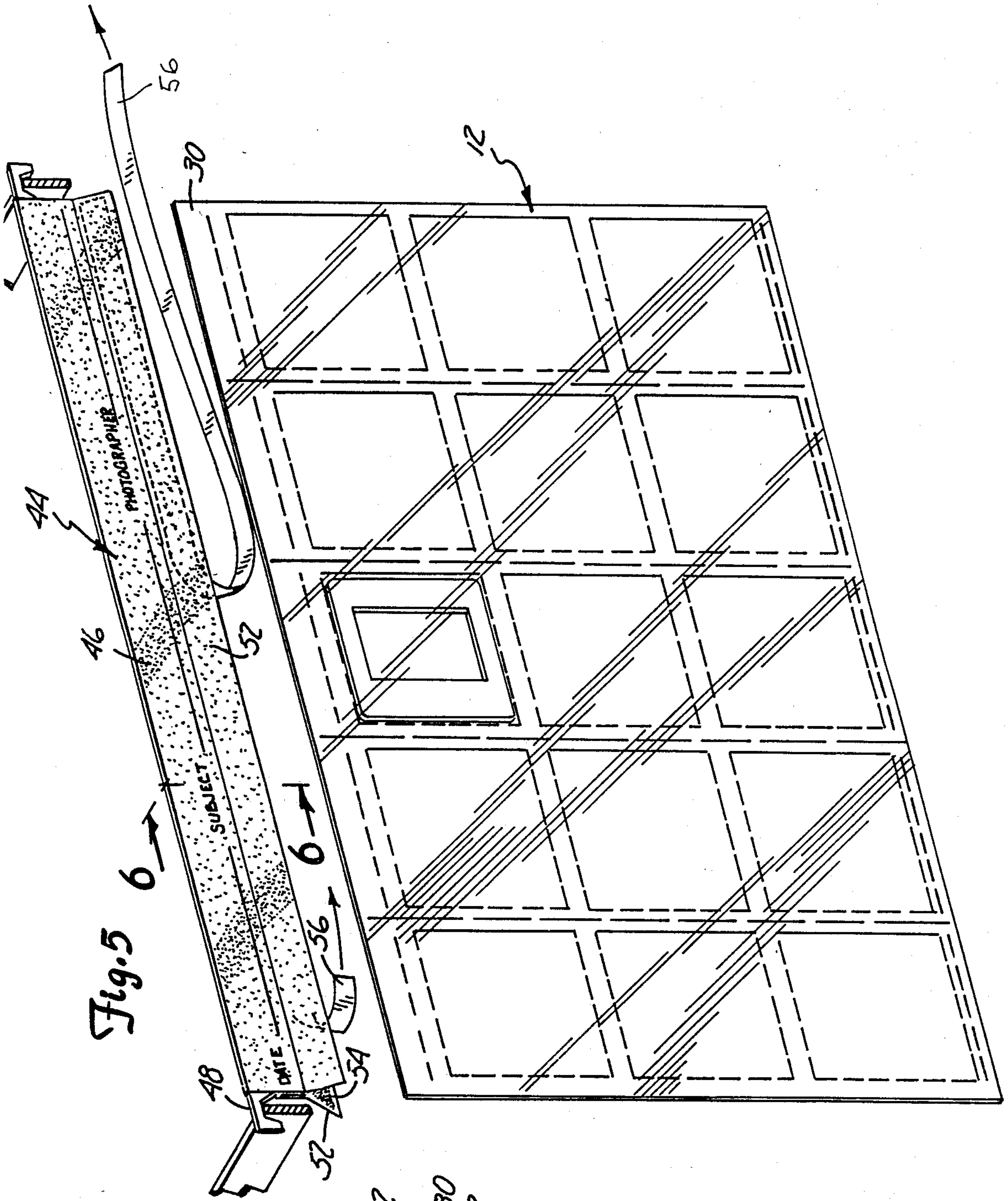
FIG. 5 is an exploded view illustrating the assembly of the hanging slide storage file shown in FIG. 3.
Figure 6:
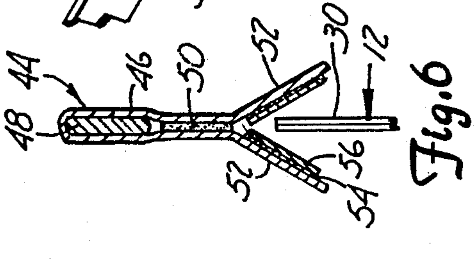
FIG. 6 is a sectional view, taken from the side, of a portion of the slide storage file shown in FIG. 5.

Slide storage files such as hanging file 40 (FIG. 3) and ring binder file 42 (FIG. 4) can be assembled from sheets of sleeving material 12 which have been separated from roll 10. Hanging file 40 is formed by attaching a hanging file storage mount 44 to edge 30 of a five row section of sleeving material 12. As shown in greater detail in FIGS. 5 and 6, hanging file storage mount 44 is formed by a mounting member 46 which is affixed to a hanger 48. Hangers such as 48 are commercially available and are generally formed from lightweight metal. Mounting member 46 can be fabricated from cardboard or any other desired material. Mounting member 46 can be secured to hanger 48 by folding it in half around the hanger and fastening overlying portions together by adhesive 50. Two adjacent flaps 52 extend beyond the portions of mount 46 secured by adhesive 50. Strips of adhesive 54 with overlying protective covers 56 are applied to the inside facing surfaces of flaps 52. Hanging file 40 is assembled by removing protective covers 56 and affixing the surfaces of flaps 52 with adhesive 54 onto edge 30 of the sheet of slide sleeving material 12.

Figure 7:
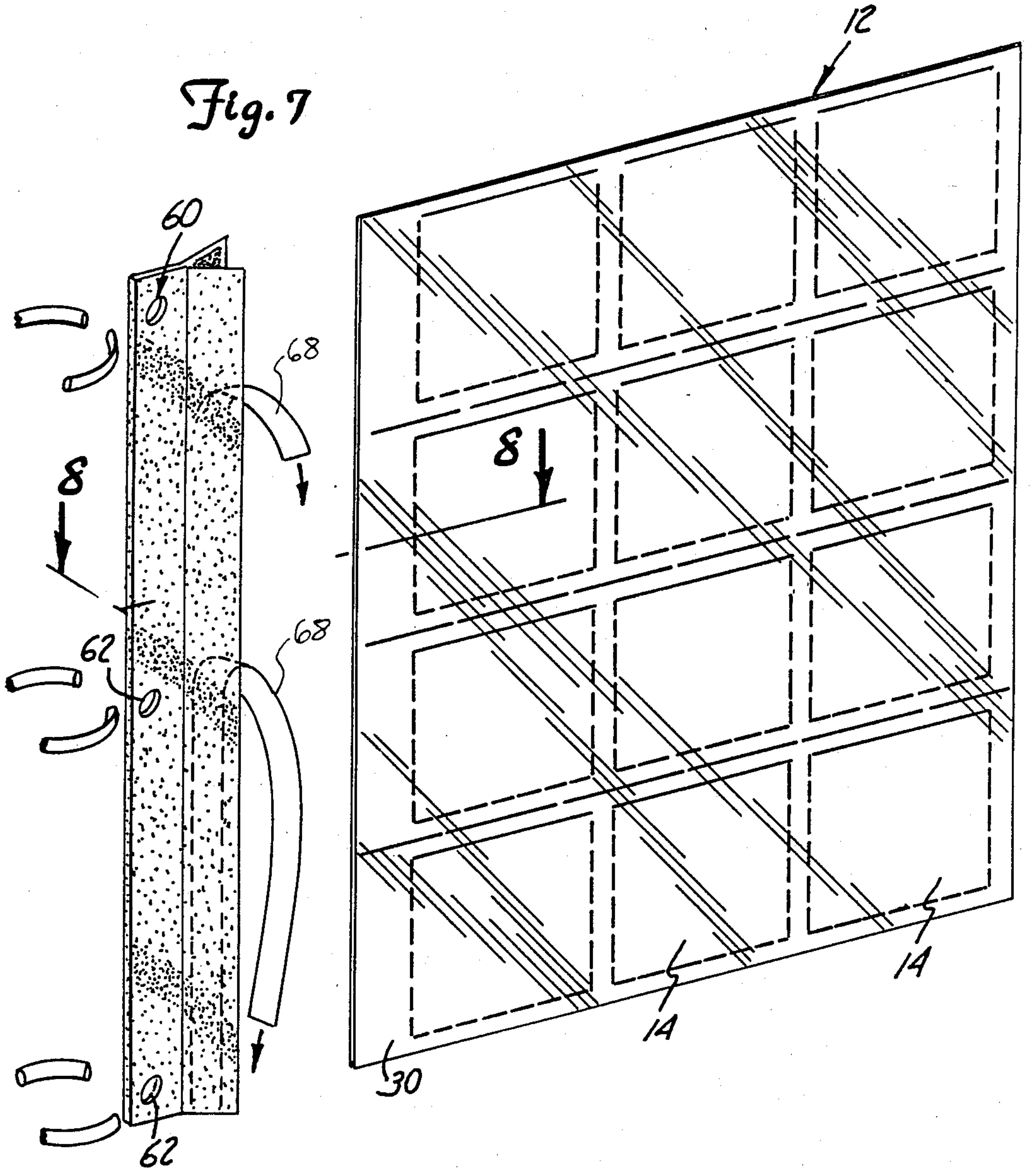
FIG. 7 is an exploded view illustrating the assembly of the ring binder slide storage file shown in FIG. 4.
Figure 8:
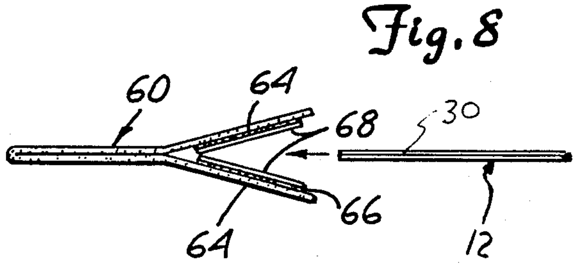
FIG. 8 is a sectional view, taken from the side, of a portion of the ring binder slide storage file shown in FIG. 7.

The assembly of ring binder file 42 can be described with reference to FIGS. 7 and 8. As shown, ring binder file 42 is formed by a ring binder storage mount 60 and a four row section of slide sleeving material 12. Ring binder mount 60 is formed by a folded strip of cardboard or other material which has a plurality of spaced holes 62 punched therethrough. The spacing of holes 62 are such that mount 60 is adapted to be received by standard ring-type binders. A pair of adjacent flaps 64 opposite mount 60 from the fold have adhesive strips 66 with protective liners 68 applied to their facing inside surfaces. Ring binder file 42 is assembled by removing liners 68 from ring binder mount 60 and affixing the surfaces of flaps 64 with adhesive 66 to edge 30 of the sheet sleeving material 12.

Figure 9:
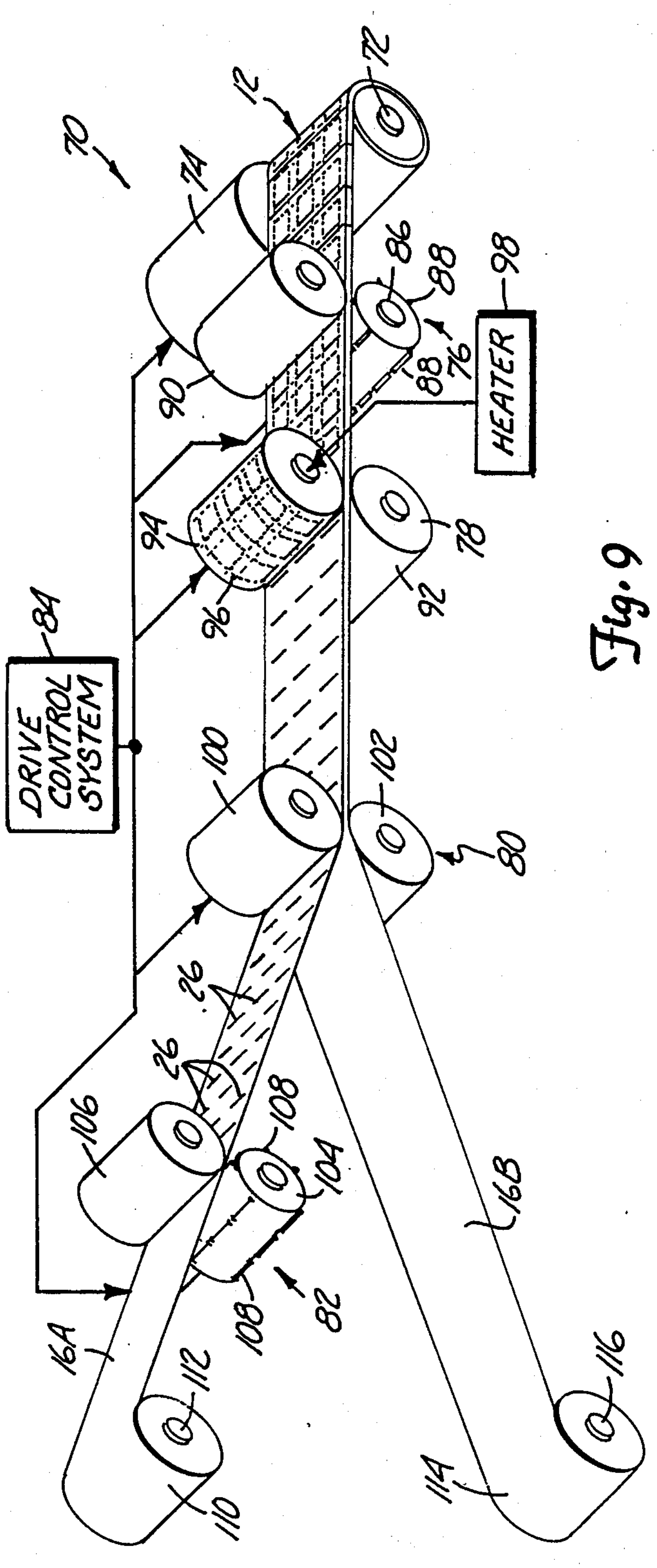
FIG. 9 illustrates apparatus for and the manufacture of slide sleeving material of the type shown in FIG. 1, in accordance with a first embodiment of the present invention.

Web press 70 which can be used to manufacture slide sleeving material 12 in accordance with a first manufacturing method is illustrated generally in FIG. 9. Web press 70 includes a take-up reel 72 which is driven by motor 74, a perforating station 76, a laminating station 78, a joining station 80 and pocket slot cutting station 82. The operation of motor 74 and stations 76, 78, 80 and 82 are controlled and coordinated by a drive control system 84. Drive control system 84 can be an electric or mechanical system.

Perforating station 76 includes a perforating drum 86 and a support drum 90 which are positioned adjacent one another. Drum 86 has a plurality of rows of perforating blades 88 longitudinally positioned thereon. Laminating station 78 includes a support drum 92 and a heat sealing drum 94. Heat sealing drum 94 includes a plurality of embossing ridges 96 which extend from the exterior surface of the drum and are positioned in such a manner as to correspond to the desired dimensions of top walls 18, bottom walls 20, and side walls 22 and 24 of pockets 14. Drum 94 is heated by a heater 98.

Joining station 80 includes adjacent drums 100 and 102. Slot cutting station 82 includes slot cutting drum 104 and support drum 106. Slot cutting drum 104 has a plurality of rows of slot cutting blades 108 longitudinally positioned thereon. Blades 108 are positioned on the outer surface of drum 104 so as to correspond to the dimensional relationships of slots 26 of pockets 14.

First film web section 16A is provided from a film roll 110 which is mounted to spool 112. Second film web section 16B is provided from a second roll 114 which is mounted to spool 116. After being unwound from roll 110, first web section 16A is sequentially fed through the gap between drums 104 and 106 of slot cutting station 82, the gap between drums 100 and 102 of joining station 80, the gap between drums 92 and 94 of laminating station 78, and the gap between drums 86 and 90 of perforating station 76, before being wound onto take-up reel 72. Second web section 16B is unwound from roll 114, and fed through the drums of stations 80, 78, and 76, adjacent web section 16A as shown, before being wound onto take-up reel 72.

Motor 74 runs continuously during the manufacturing operation, winding fabricated sleeving material 12 onto take-up reel 72. As it passes through slot cutting station 82, three pocket opening slots 26 are cut through first web section 16A by blades 108. Slots 26 are linearly adjacent to one another in a transverse direction across web section 16A. Each newly cut row of slots 26 will be spaced from a previously cut row by predetermined dimensions such as those described above. After leaving slot cutting station 82, slotted web section 16A is brought into positional alignment adjacent web section 16B at joining station 80. Joined web sections 16A and 16B are then fed through laminating station 78.

Web sections 16A and 16B are laminated together as they pass through laminating station 78. The laminating is performed by embossing ridges 96 on heat sealing drum 94. As ridges 96 contact first web 16A, adjoining portions of web sections 16A and 16B which are adjacent the ridges are melted together. Since ridges 96 correspond to top walls 18, bottom wall 20 and side walls 22 and 24 of pockets 14, the respective walls of the pockets are formed as web sections 16A and 16B are laminated together.

After emerging from laminating station 78, laminated web sections 16A and 16B pass through perforating station 76. Perforating blades 88 of drum 86 will perforate or cut through portions of the laminated web between top walls 18 of pockets 14 in one row, and bottom walls 20 of pockets 14 in an adjacent row. Rows of pockets 14 can then be easily separated from one another.

Drive control system 84 coordinates the rotation of drums 104, 94 and 86 with the rotation of motor 74 is such a manner that slots 26, walls 18, 20, 22 and 24 and perforations 28 are properly positioned with respect to one another to properly form sleeving material 12. As shown, completed sleeving material 12 is rolled onto take-up reel 72.

Figure 10:
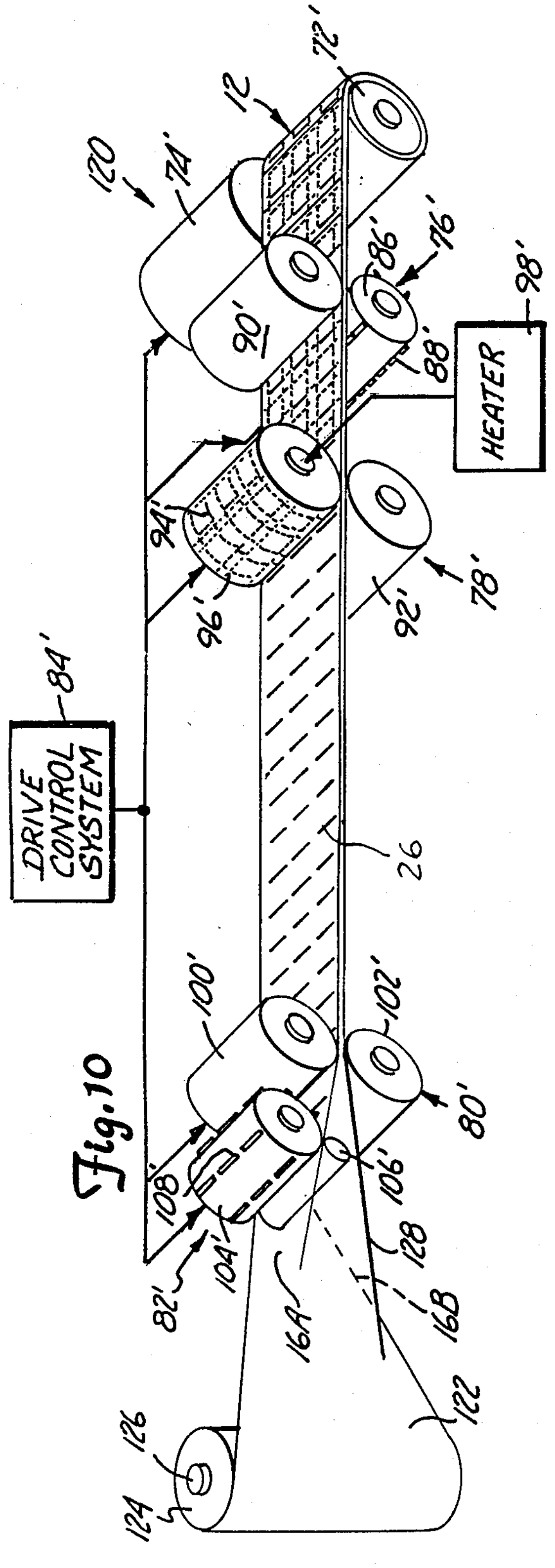
FIG. 10 illustrates apparatus for and the manufacture of slide sleeving material of the type shown in FIG. 1, in accordance with a second embodiment of the present invention.

Web press 120 which can be used to manufacture slide sleeving material 12 in accordance with a second method is illustrated generally in FIG. 10. Many elements of web press 120 can be functionally identical to web press 70 described above, and are identified by identical reference numerals which have been primed. As shown, web press 120 includes a take-up reel 72′ and drive motor 74′, perforation station 76′, laminating station 78′, joining station 80′, and pocket slot cutting station 82′. Motor 74′ and stations 76′, 78′, 80′ and 82′ are all interfaced to drive control system 84′. A heater 98′ is also interfaced to drum 94′ of laminating station 78.

Web press 120 is supplied with a single web 122 of polymer film material from a roll 124 which is mounted on spool 126. After leaving roll 124, web 122 is folded in half about a fold line 128, so as to form adjoining web sections 16A and 16B. After web 122 is folded, web section 16A is fed through pocket slot cutting station 82′ and subsequently joined together with web section 16B at joining station 80′. The operations performed by stations 76′, 78′, 80′ and 82′ are identical to those described above with reference to FIG. 9. Following the manufacture of slide sleeving material 12 on web press 120, the sleeving material is wound onto take-up reel 72′.

Figure 11:
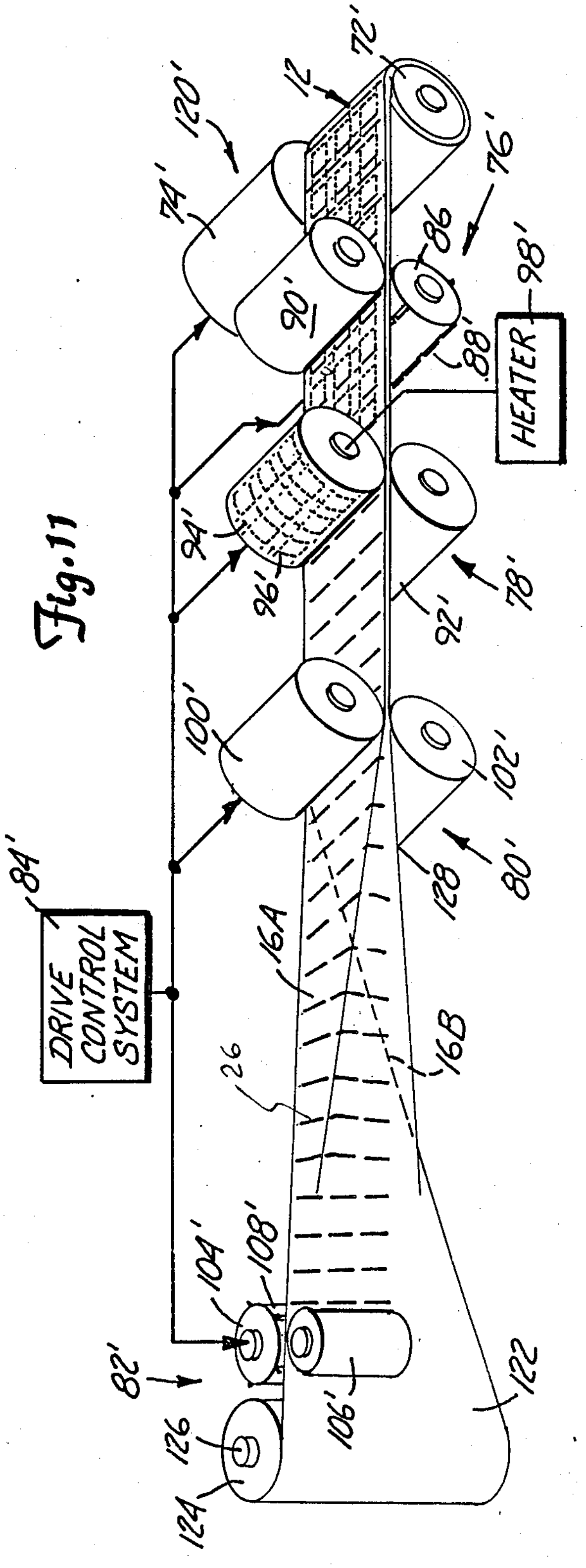
FIG. 11 illustrates apparatus for and the manufacture of slide sleeving material of the type shown in FIG. 1, in accordance with a third embodiment of the present invention.

Web press 120′ is illustrated in FIG. 11. Web press 120′ functions in a manner similar to that of web press 120 described with reference to FIG. 10, and similar features are identified by identical reference numerals. The difference between web press 120′ and web press 120 is in the positioning of pocket slot cutting station 82′. As shown in FIG. 11, pocket cutting station 82′ of web press 120′ is positioned to cut pockets in web 122 as it is unwound from roll 124 and before it is folded to form web sections 16A and 16B. All other functions of web press 120′ are identical to those described above with reference to press 120.

Commercially available web presses such as those manufactured by Webtron and Mark Andy can be adapted to implement the manufacturing operations described with reference to FIGS. 9–11. Slide sleeving material 12 can be quickly, continuously and inexpensively manufactured in accordance with these methods.

Although the present invention has been described with reference to the preferred embodiments, those skilled in the art will recognize that changes may be made in form and detail without departing from the spirit and scope of the invention.

What is claimed is:

1. A method for manufacturing photograph slide sleeving material, including:

providing a continuously moving first web section of polymer film material to a cutting station;

continuously cutting a plurality of pocket opening slots aligned in a transverse direction and spaced in a longitudinal direction along the first web section of film material while it moves past the cutting station, to form a continuously moving slotted first web section of film material;

providing the continuously moving slotted first web section of film material to a laminating station;

providing a continuously moving second web section of polymer film material to the laminating station;

laminating the slotted first web section of film material to the second web section of film material at locations forming a plurality of pocket bottom walls and a plurality of side walls while the web sections move past the laminating station, to form a web of slide sleeving material having a plurality of transversely oriented and parallel rows of pockets;

continuously moving the web of slide sleeving material from the laminating station to a perforating station;

perforating the laminated web of slide sleeving material between the rows of pockets to form sheets as it moves past the perforating station; and winding the perforated, laminated web of side sleeving material on a spool.

2. The method of claim 1 wherein:

providing the first web section of film material includes providing the first web section of film material from a first roll of film material; and providing the second web section of film material includes providing the second web section of film material from a second roll of film material.

3. The method of claim 1 wherein providing the first web section of film material and providing the second web section of film material include:

providing one roll of film material; and continuously folding the web of film material as it is unwound from the roll, to form continuously moving and adjoining first and second web sections.

4. The method of claim 1 wherein laminating the slotted first web section to the second web section includes heat sealing the first web section to the second web section at locations forming pocket side walls and bottom walls.

5. A method for manufacturing a slide storage file, including:

providing a continuously moving first web section of polymer film material to a cutting station;

continuously cutting a plurality of pocket opening slots aligned in a transverse direction and spaced in a longitudinal direction along the first web section of film material while it moves past the cutting station, to form a continuously moving slotted first web section of film material;

providing the continuously moving slotted first web section of film material to a laminating station;

providing a continuously moving second web section of polymer film material to the laminating station;

laminating the slotted first web section of film material to the second web section of film material at locations forming a plurality of pocket bottom walls and a plurality of side walls while the web sections move past the laminating station, to form a web of slide sleeving material having a plurality of transversely oriented and parallel rows of pockets;

continuously moving the web of slide sleeving material from the laminating station to a perforating station;

perforating the laminated web of slide sleeving material between the rows of pockets to form sheets as the web moves past the perforating station;

separating a sheet of slide sleeving material from the web of slide sleeving material;

providing a storage mount having an adhesive strip on an edge thereof; and affixing the edge of the storage mount with the adhesive strip to an edge of the sheet of slide sleeving material.

6. The method of claim 5 wherein:

providing the storage mount includes providing a hanging file storage mount having an adhesive strip on the edge thereof and a protective cover overlying the adhesive strip and affixing the edge of the storage mount to the sheet includes removing the protective cover before affixing the edge of the storage mount to the edge of the sheet of slide sleeving material.

7. The method of claim 5 wherein:

providing the storage mount includes providing a ring binder storage mount with an adhesive strip on the edge thereof and a protective cover overlying the adhesive strip; and affixing the edge of the storage mount to the sheet includes removing the protective cover before affixing the edge of the storage mount to the edge of the sheet of slide sleeving material.

* * * * *